UNITED STATES PATENT OFFICE.

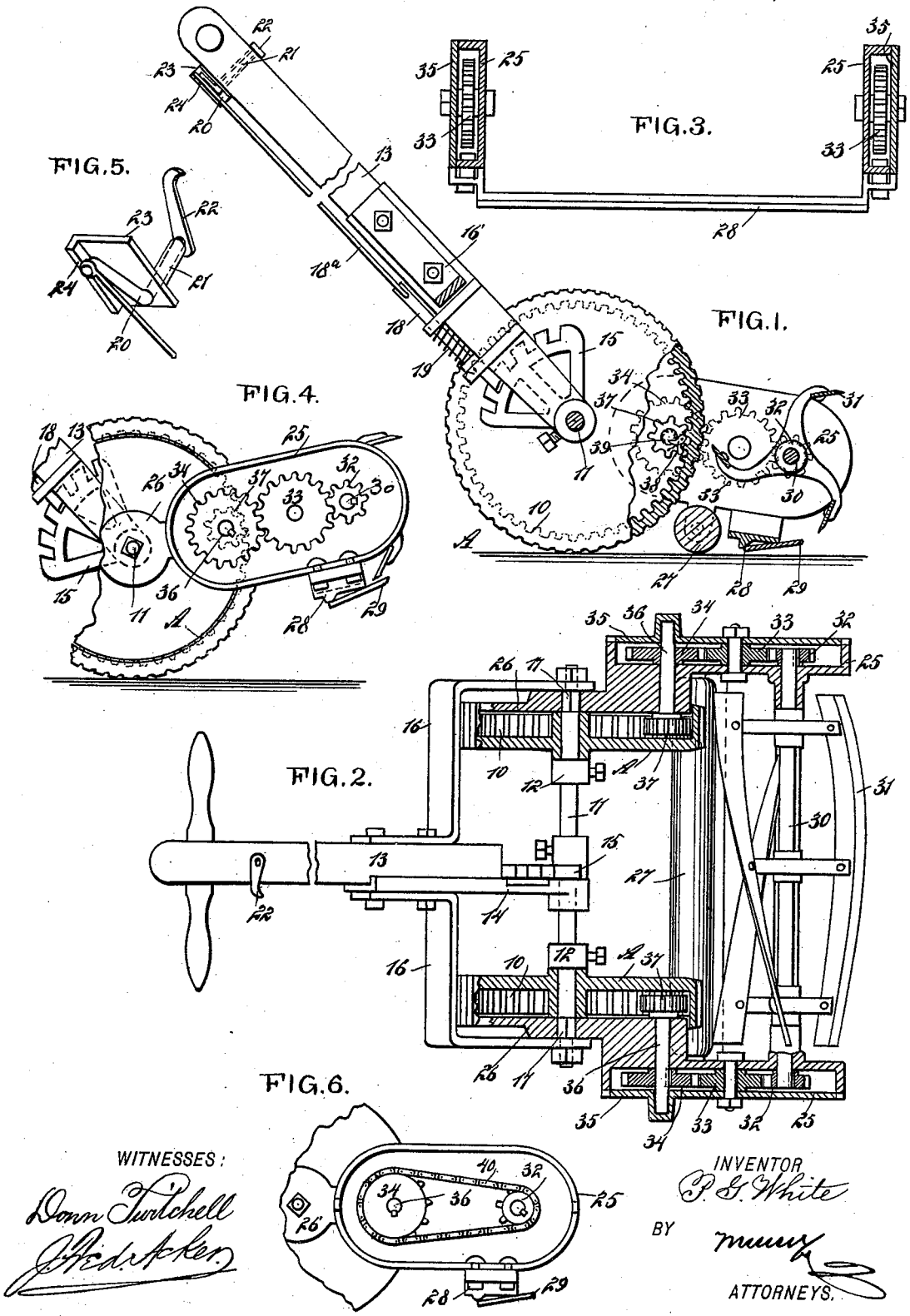

PERRY G. WHITE, OF CEDAR RAPIDS, IOWA, ASSIGNOR OF ONE-HALF TO CHARLES W. PERKINS, OF SAME PLACE.

LAWN-MOWER.

SPECIFICATION forming part of Letters Patent No. 599,208, dated February 15, 1898.

Application filed May 13, 1897. Serial No. 636,305. (No model.)

*To all whom it may concern:*

Be it known that I, PERRY G. WHITE, of Cedar Rapids, in the county of Linn and State of Iowa, have invented a new and Improved Lawn-Mower, of which the following is a full, clear, and exact description.

The object of the invention is to provide a simple, economic, and durable device whereby the cutters may be adjusted to cut grass at various lengths, the adjustment being made from the handle of the mower, and whereby the mower may be placed in such position that it will be flexible, adapting itself to the surface of a terrace or embankment, cutting the grass thereon as evenly as upon a level surface.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a central vertical section through the machine, the ground-wheel being shown partially in section. Fig. 2 is a plan view of the lawn-mower. Fig. 3 is a vertical section taken through the gear-casings and illustrating the connection between the casings. Fig. 4 is a detail side elevation of one of the gear-casings, the cap being removed, showing also a portion of the adjacent ground-wheel, the ground-wheel being broken away to illustrate the adjusting mechanism for the casing and the casing being shown in an upper position. Fig. 5 is a detail perspective view of a portion of the adjusting device for the cutting-blades, and Fig. 6 is a detail view illustrating a slight modification in the driving mechanism.

The ground-wheels A are provided with internal teeth 10 and are mounted to turn loosely upon an axle 11, being prevented from side movement by collars 12. A handle 13 is pivotally attached to the axle 11 through the medium of an extension 14, and upon said axle adjacent to said handle a segmental rack 15 is firmly secured.

Angle-arms 16 are attached to the handle and are projected from opposite sides thereof, said angle-arms serving as journals for the outer extremities of the axle 11, and adjacent to each extremity of the axle said axle is made polygonal in cross-section, as indicated at 17 in Fig. 2. A bolt 18, controlled by a spring 19, has guided movement at the under side of the handle 13, the bolt being adapted to enter the spaces in the rack 15, as shown in Figs. 1 and 4. The bolt is attached to a rod 18ª, and this rod is carried upward to a pivotal engagement with a crank-arm 20, formed upon a shaft 21, held to turn, preferably, in a sleeve fitted in the handle, and at the opposite end of the shaft a handle 22 is secured, which is independent of the handle 13 of the mower.

A plate 23 is attached to the machine-handle 13 at its lower surface, the said plate being provided with a flange 24 at one of its edges. When the handle 22 of the shaft 21 is in its normal position, (shown in Figs. 1 and 2,) the bolt 18 will be in engagement with the rack 15; but when the handle 22 of the said crank-shaft 21 is moved in an opposite direction, or so as to throw the crank 20 past its center and to an engagement with the flange 24 of the plate 23, as illustrated in Fig. 5, the bolt 18 will be held out of engagement with the aforesaid rack 15.

Outside of each ground-wheel A and partially in advance of each ground-wheel a gear-casing 25 is located. This gear-casing is provided with a rearward extension 26, which is fitted upon the polygonal portion 17 of the axle 11. From the lower portion of each gear-casing 25 in advance of the ground-wheels A an ear is downwardly projected, in which the trunnions of a roller 27 are journaled, and in advance of this roller 27 a cross-bar 28 is constructed, which connects said gear-casings, as shown particularly in Fig. 3. This cross-bar 28 carries the ledger knife or blade 29, as illustrated in Figs. 1 and 4.

In the forward portion of the gear-casings a cutter-shaft 30 is journaled, provided with the usual spiral cutting-blades 31, adapted to work in conjunction with the ledger blade or knife 29. At each end of the cutter-shaft 30 a pinion 32 is secured in each of the gear-casings. These pinions 32 mesh with gears 33, also journaled in the said casings, and said intermediate gears 33 mesh with rear gears 34, these latter gears being secured to shafts 36, journaled partially in the body of the casings 23 and partially in the caps 35, provided for said casings and constituting the outer faces of the same.

At the inner end of each shaft 36 a pinion 37 is loosely mounted, the pinions engaging with the teeth 10 in the supporting-wheels A. Each pinion is ordinarily provided with a dog 38, and these dogs mesh with ratchet-wheels 39, secured upon the shafts 36, so that the cutter-shaft will be operated only when the machine is pushed forward.

In Fig. 6 I have illustrated a slight modification in the driving mechanism for the machine. Under this construction the intermediate gear 33 in each of the gear-casings 25 is omitted, and the pinion 32 and gear 34 are in the nature of sprocket-wheels and are connected by chain belts 40.

In operation as the machine is advanced the cutter-shaft will be revolved and the cutters will effectively cut the grass. The cutters may be raised or lowered, so as to operate in long or in short grass, as occasion may demand, by simply causing the bolt 18 to engage with a lower or an upper notch in the rack 15 and pressing downward on the handle to elevate the roller 27 the desired distance to gage the cut, the operator then being required to maintain the cutters at an even height by bearing upon the handle. When the bolt 18 engages with an upper notch, the cutters and gear-casings will be raised, as shown in Fig. 4, so far above the ground as to leave the grass when cut at a maximum of length, or hold the cutters in such position that the machine may be readily carried from the field or lawn.

When operating on a terrace, an embankment, or the like, the handle 22 of the shifting mechanism for the bolt 18 is turned in a direction to carry the bolt out of engagement with the rack and lock it in such position, as shown in Fig. 5. At this time there will be a flexible connection between the body of the lawn-mower and its handle 13, enabling the cutters on the lawn-mower to accommodate themselves to the inequalities of the ground and to the slope of a terrace over which it may be passed.

Having thus described my invention, I claim as new and desire to secure by Letters Patent—

1. In a lawn-mower, the combination with an axle, ground-wheels loosely mounted on the axle, gear-casings connected together and rigidly mounted on the ends of the axle, and a cutting mechanism carried by said casings, of a handle loosely mounted on the axle, a rack secured to the axle, a spring-pressed bolt carried by the handle and engaging the rack, a crank-shaft mounted in the outer end of the handle and connected with the bolt, and means for locking said crank-shaft, substantially as described.

2. In a lawn-mower, the combination, with the axle, ground-wheels loosely mounted upon the axle, having internal teeth, casings secured to said axle, one at each end, a cutter-shaft journaled in said casings, and gear connections between the ends of the cutter-shaft and the toothed portions of the ground-wheels, of a handle loosely mounted on said axle, having an angular plate secured thereto, a crank-shaft passed through said plate and through said handle, a rack secured upon the axle, a spring-controlled bolt arranged for engagement with said rack, and a connection between the bolt and the crank-arm of the crank-shaft, the said crank-arm of the crank-shaft being arranged for engagement with a portion of the plate attached to the handle, for the purpose set forth.

3. In a lawn-mower, the combination with the axle, a handle loosely mounted on the axle, a rack secured to the axle, and a spring-bolt on the handle for engaging the rack to lock the handle in position, of a shaft mounted in the handle and provided with a crank-arm at one end and a handle on the other, a connection between the crank-arm and bolt, and a plate secured to the handle and provided with a flange with which the crank-arm is adapted to engage, substantially as described.

PERRY G. WHITE.

Witnesses:
CHARLES W. PERKINS,
C. H. FRENCH.